Aug. 29, 1961  M. GEE  2,998,505
WORKTOOL MOUNTING AND MOTIVATING APPARATUS
Filed Dec. 30, 1958  2 Sheets-Sheet 2
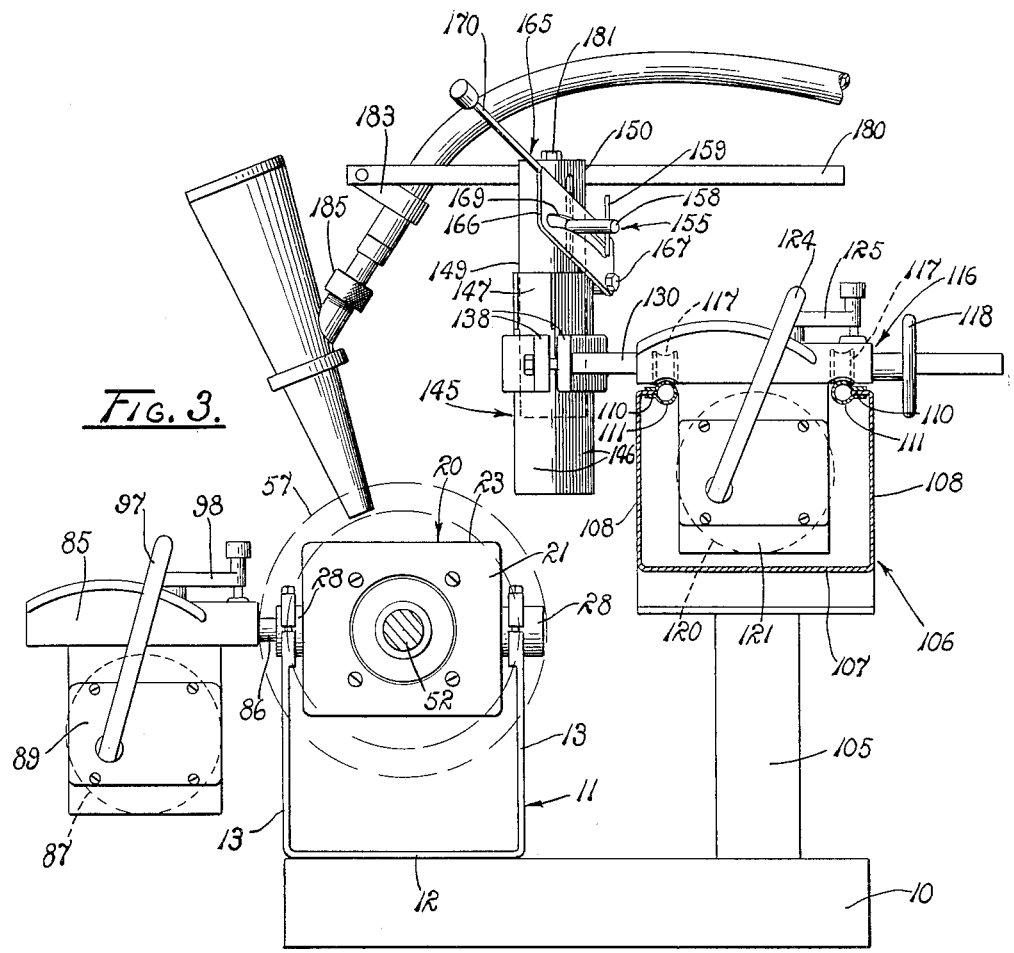
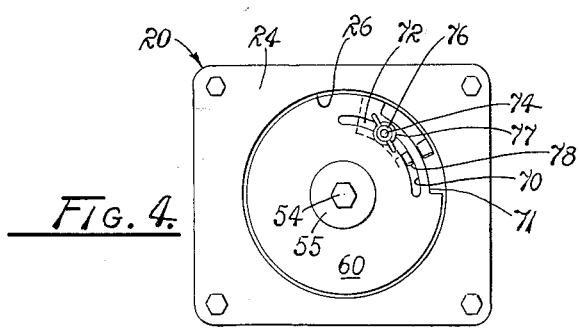
MINOR GEE
INVENTOR
HUEBNER & WORREL
ATTORNEYS

United States Patent Office 2,998,505
Patented Aug. 29, 1961

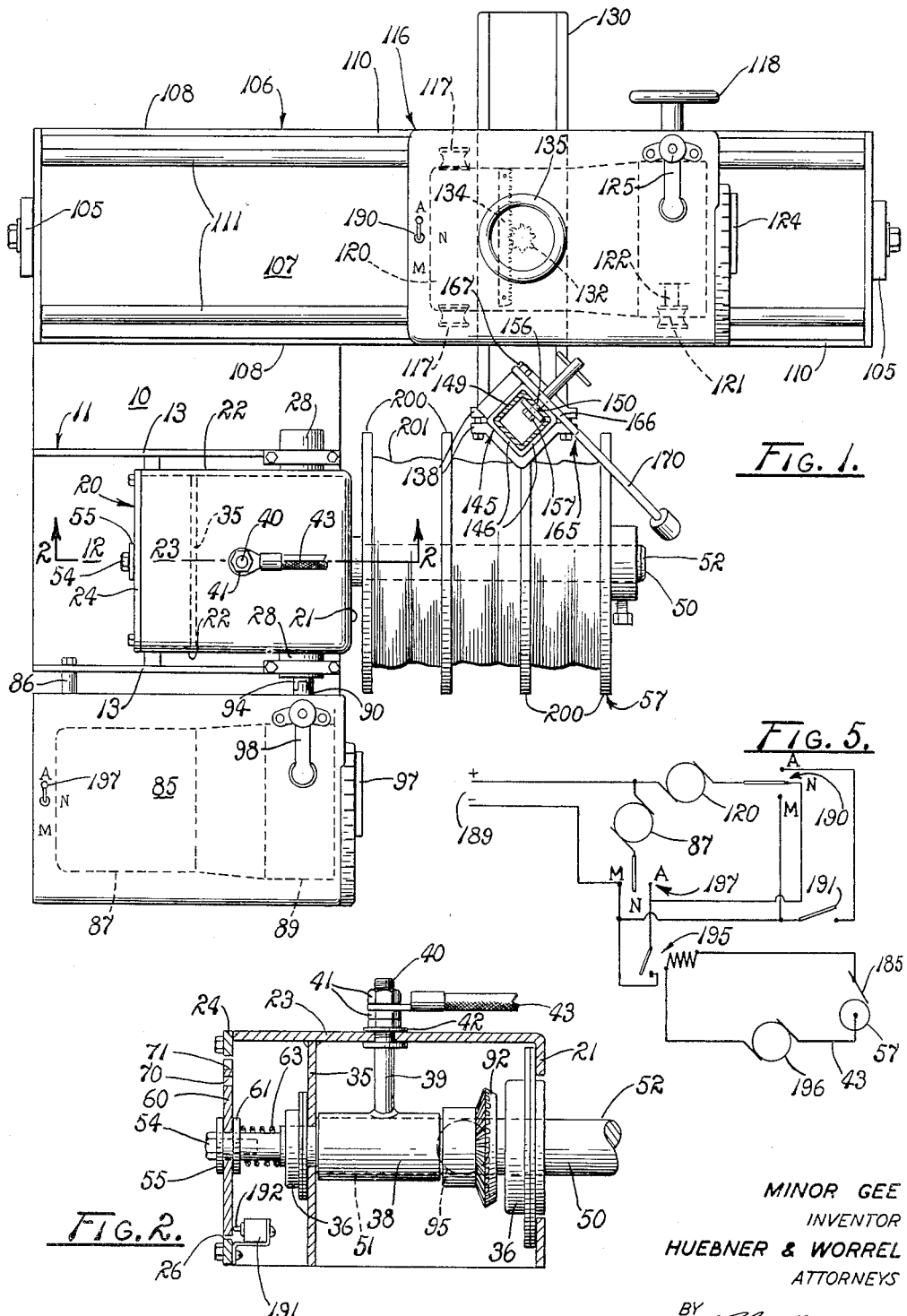

2,998,505
WORKTOOL MOUNTING AND MOTIVATING APPARATUS
Minor Gee, 3601 Academy Road, Sanger, Calif.
Filed Dec. 30, 1958, Ser. No. 783,831
12 Claims. (Cl. 219—76)

The present invention relates to a worktool mounting and motivating apparatus and more particularly to an apparatus for mounting a worktool adjustably in a work position adjacent to a workpiece which is adapted to be rotated and for motivating the tool along the workpiece in predetermined successive increments or steps of progression incident to rotation of the workpiece through successive predetermined angles.

The apparatus of the subject invention has particular utility in performing certain welding operations and is conveniently described in this environment. For example, the annular bearing surfaces of an idler, or roller, used to carry the track of a tracklaying vehicle, such as a tractor, wear excessively during use so that the idler, or roller, must be replaced or the bearing surface rebuilt.

In the past the rebuilding of idlers and rollers has been performed largely by hand. That is, the welder has manually moved an electrode around the bearing surface to deposit a layer of weld material on the bearing surface so as to increase its thickness a desired amount. However, the thickness and uniformity of the layer of weld material so disposed is dependent on the skill of the welder so that this method lacks the precision desired, requires subsequent grinding and finishing, and is time consuming and expensive.

It has also been known to mount the idler, or roller, on a rotating shaft and to support the electrode on a carriage which rides along a track in spaced parallel relation to the shaft. With the electrode held in a predetermined initial position, the shaft is rotated to deposit a circumferential bead of weld material. As soon as the first bead is deposited, the carriage is manually moved, usually by a geared drive and crank, longitudinally of the track by a predetermined increment and a second annular bead of weld material deposited on the idler. Thus, successive beads of weld material are deposited in side-by-side relation over the bearing surface to build up the desired layer. Although this method is an improvement over that described above, it still does not deposit a sufficiently uniform and smooth continuous layer and requires subsequent grinding to finish the surface.

Accordingly, it is an object of the present invention to provide a worktool mounting and motivating apparatus.

Another object is to provide an apparatus for mounting a worktool in a predetermined work position adjacent to a workpiece adapted to be rotated and for automatically motivating the tool along the workpiece in successive predetermined steps incident to rotation of the workpiece through predetermined successive angles.

Another object is to rebuild the outer annular bearing surface of an annular member, such as an idler or roller, with a continuous, smooth layer of weld material having uniform thickness circumferentially of the annular member.

Another object is to minimize the time and expense involved in rebuilding bearing surfaces of annular members.

Another object is to obviate or to minimize the necessity of final grinding or smoothing operations subsequent to rebuilding the bearing surface of an annular member with weld material.

Another object is to mount a worktool for adjustable movement in precise amounts toward and away from a workpiece.

Another object is to provide an adjustable worktool mount having selective fine and coarse adjustments.

Another object, in a welding apparatus of the nature described, is to initiate rotation of a workpiece incident to electrical contact of the welding electrode with the workpiece.

Another object, in a welding apparatus of the type described above having rotatable workpiece mounting means, is to provide a dependable ground connection for the mounting means.

Other objects are to provide an apparatus for mounting and motivating a worktool which has utility in performing a variety of operations on various workpieces.

These, together with other objects, will become more fully apparent upon reference to the following description.

In the drawings:

FIG. 1 is a top plan view of an apparatus embodying the principles of the present invention.

FIG. 2 is a somewhat enlarged vertical section taken on line 2—2 of FIG. 1.

FIG. 3 is an end elevation of the apparatus shown in FIG. 1 and also including a welding tool supported by the apparatus.

FIG. 4 is a somewhat enlarged end view of a portion of the apparatus of FIG. 1.

FIG. 5 is an electrical circuit employed in the apparatus of the present invention.

Referring more particularly to the drawings, a bench is identified by the numeral 10 in FIG. 3, and an upwardly disposed U-shaped cradle 11 is rigidly mounted on the bench adjacent to a side edge thereof. The cradle includes a base flange 12 secured to the bench and a pair of spaced parallel side flanges 13 upwardly extended from the base.

A generally rectangular housing 20 provides integrally associated front, side and top walls 21, 22 and 23, respectively, and a rear wall 24 releasably connected to the side and top walls in spaced parallel relation to the front wall. The rear wall has a circular opening 26, best seen in FIG. 4. The housing is rotatably supported in the cradle 11 by means of trunnions 28 interconnecting the side flanges 13 and the side walls. Although the housing may be rotated about an axis defined by the trunnions, it is firmly held in selected positions into which it is rotated.

A partition 35 is rigidly mounted within the housing 20 in adjacent spaced parallel relation to the rear wall 24, and coaxially aligned bearings 36 are respectively mounted on the front wall 21 and in the partition. It is also to be noted at this point that the opening 26 in the rear wall is also coaxial with the bearings. A grounding sleeve 38, preferably of copper, or other electrically conductive material, is rigidly held in coaxial relation with and between the bearings by means of a rigid conducting rod 39, also of such conductive material, extended through the top wall 23 of the housing and having an upper threaded outer end 40. Suitable nuts 41 are screw-threaded on the upper end of the rod against a washer 42 for connecting a ground cable 43 to the rod and thus to the grounding sleeve.

An elongated workpiece mounting shaft 50 has an inner rearward end portion 51 journaled in the bearings 36 and engageable with and rotatable within the grounding sleeve 38. The shaft also has an outer forward end portion 52 extended forwardly of the front wall 21. The inner end portion of the shaft also extends through the opening 26 in the rear wall 24, and a bolt 54 having an outer washer 55 rigidly secured to the head of the bolt is coaxially screw-threaded in an axial bore in the inner end of the shaft. The outer end portion of the shaft is adapted to mount a workpiece 57, such as an idler or roller, or other annular member in rigid position thereon.

A circular actuator disc 60 is freely rotatably concentrically mounted on the inner end 51 of the shaft 50 against the washer 55 and has an inner washer 61 secured to the surface of the disc opposite to the surface engaging the outer washer. The actuator disc is not only rotatable on the shaft but also slidable longitudinally forwardly and toward the partition 35. A coiled compression spring 63 encircles the shaft and bears against the inner washer and the bearing 36 secured to the partition for yieldably urging the disc into engagement with the outer washer so that the disc rotates with the shaft. The spring urges the disc into the plane of the rear wall 24 so that the outer edge of the disc is in circumferentially, closely adjacent, spaced relation to the edge defining the opening 26 in the rear wall. The purpose of this construction is to enable rotational movement of the disc relative to the shaft incident to pressing the disc forwardly on the shaft while still enabling rotation of the disc with the shaft after its rotational position has been selected.

The disc 60 has elongated inner and outer arcuate slots 70 and 71 concentric to the shaft 50 and adjacent to the outer edge of the disc. An arcuate plate 72 is mounted on the disc by means of a bolt 74 extended outwardly through the inner slot, and a wing nut 76 is screw-threadably connected to the outer end of the bolt. A washer 77 is interposed the wing nut and the outer face of the disc. The plate is thus mounted for adjustable inwardly overlaying relation with the slots and has the effect of increasing or decreasing the length of the slot for a purpose to be described. Additionally, the plate has cam portions 78 individually outwardly arcuately extended into the slots.

With particular reference to FIGS. 1 and 3, a motor support bracket 85 is connected to the outer side flange 13 of the cradle 11 by means of studs 86 and supports a workpiece rotating motor 87 in dependent relation thereon. The motor has an output shaft, not shown, connected to an input shaft, not shown, of a gear box 89 and the latter has an output shaft 90. As best seen in FIG. 2, a driven gear 92 is rigidly connected to the workpiece mounting shaft 50 between the grounding sleeve 38 and the forward bearing 36. An intermediate shaft 94 is releasably coupled to the output shaft 90, and is coaxially rotatably extended through the outer trunnion 28. A drive gear 95 is secured to the shaft 94 and is in mesh with the driven gear 92 on the workpiece mounting shaft. Thus, when the workpiece motor is energized, the shaft 50 is rotated. The purpose of the gear box is to provide the desired speed of rotation of the shaft and thus is provided with a speed changing lever 97. Further, the gear box is capable of changing the direction of rotation of the intermediate shaft, and thus the workpiece mounting shaft, and this function is controlled by a direction control handle 98. The details of construction of the gear box are well-known, form no particular part of the present invention, and thus are not described in any greater detail.

With reference to FIG. 3, a standard 105 is rigidly upwardly extended from the bench 10 in laterally spaced relation to the cradle 11, and an elongated upwardly disposed U-shaped trough 106 is mounted in horizontal position on the standard. The trough has a base 107 secured to the standard, and sides 108 upwardly extended from the base in parallel spaced relation. An elongated track, generally indicated by the numeral 110 includes spaced parallel rails 111 individually connected to the upper edges of the sides of the trough. It will thus be evident that the track is in laterally upwardly spaced parallel relation to the workpiece mounting shaft 50.

A worktool mounting carriage 116 is mounted for longitudinal movement on the track 110 by means of wheels 117 engaging the rails 111. A hand wheel 118 is connected to one of the wheels for manually motivating the carriage along the track. A carriage motor 120 is borne in dependent relation by the carriage and thus is disposed within the trough 106. As with the motor 87, the motor 120 has an output shaft, not shown, connected to a gear box 121 which has an output shaft 122 connected to one of the wheels. Further, the gear box has a speed changing lever 124 and a direction control lever 125. Thus, when the carriage motor is energized, it drives one of the wheels and thus motivates the carriage along the track at a predetermined speed depending upon the position of the lever 125 and in a direction depending upon the position of the lever 125.

An elongated rack 130 is transversely extended through a slot in the carriage 116 for movement transversely of the carriage and the track 110. For this purpose a pinion 132 is mounted in the carriage for rotation about a vertical axis and is in engagement with a rack gear 134 secured to the rack. A hand wheel 135 is connected to the pinion for rotation thereof and thus for controlling transverse adjustment of the rack. The rack is mounted so that it can be completely removed from the carriage and inserted into the carriage from either side thereof. A clamp 138, best seen in FIG. 3, is secured to an end of the rack for a purpose now to be described.

An elongated sleeve 145 having a rectangular cross section is rigidly adjustably held in the clamp 138 in an upright position and is elevationally adjustable by means of the clamp. It is to be observed that the sleeve has four rectangularly arranged walls 146 with an upper portion of one of the walls separated from its adjacent walls and bent slightly inwardly of the sleeve. This upper portion thus provides a relatively constricted upper opening for the sleeve but is resiliently outwardly expansible from such constricted position. An elongated tubular post 149 of rectangular cross section corresponding in shape to the sleeve is longitudinally slidably adjustably fitted in the sleeve. Because of the constriction provided by the upper portion of the sleeve, the post is frictionally although adjustably held in predetermined positions within the sleeve. The post has an elongated longitudinally extended slot 150 in a side wall thereof, more or less of the slot being exposed upon longitudinal movement of the post outwardly and inwardly of the sleeve.

An elongated fulcrum member 155 includes a bolt 156 having a head 157 located within the post 149 and an elongated screw-threaded shank outwardly extended through the slot 150 and longitudinally adjustably slidable in the slot. The bolt head is rectangular and of a sufficiently large size so as not to permit rotation of the bolt around its axis because of engagement of the head with the sides of the post. An elongated thimble 158 is screw-threaded on the shank of the bolt and includes manipulating portions 159 screw-threaded on the thimble inwardly and outwardly of the shank. The thimble also has an annular flange 160 engaging the side of the post in which the slot is located and in marginally overlaying relation to the slot. This enables sandwiching of the post between the head of the bolt and the thimble thereby firmly adjustably holding the fulcrum member in selected positions longitudinally of the slot. A worktool adjusting lever 165 includes a blade 166 mounted for pivotal movement on a horizontal pivot pin 167 defining an axis located in a vertical plane in parallel spaced relation to the plane of the slot 150. The blade has an arcuate slot 169 which is eccentric to the pivot axis of the lever but which may be brought into transversely intersecting relation to the slot 150 in the post 149 incident to movement of the lever into opposed relation with the side of the post in which the slot is located. The slot in the lever receives the fulcrum member 155, and more specifically the thimble 158, so that the fulcrum member extends laterally outwardly from the post and through the slot in the lever. The lever has an elongated handle 170 connected to the blade for facilitating pivoting of the lever.

It will be evident that by pivoting the lever 165 upwardly and downwardly, with the thimble 158 tightened against the post 149, the post is slid outwardly and inwardly of the sleeve 145. Regardless of the longitudinal position of the fulcrum member 155 in the slot 150 the range of inward and outward movement of the post is the same for full pivoting movement of the lever. With the fulcrum member adjacent to the lower end of the slot 150, the lower end of the post is adjacent to the upper end of the sleeve when the post is in its innermost position. When the fulcrum member is closer to the upper end of the slot 150, the lower end of the post is adjacent to the lower end of the sleeve when the post is in its innermost position. Thus, adjustment of the fulcrum member longitudinally of the slot 150 may be regarded as a coarse adjustment while the pivoting of the lever may be regarded as a fine adjustment of the elevational position of the post.

An elongated worktool mounting rod 180 is mounted on the post 149 for pivotal movement about a substantially vertical pivot pin 181 generally coaxial with the post. A clamp 183 is connected to the end of the rod and is adapted to support a welding electrode 185, or other worktool, in adjacent work position to the idler 57, or other workpiece, on the shaft 50.

With particular reference to FIG. 5, the apparatus of the subject invention provides an electrical system including a source of voltage 189 which is connected in electrical circuit with a three-position carriage control switch 190 mounted on the carriage 116; a carriage triggering switch 191 mounted within the housing 20 on the rear wall 24 thereof; and the carriage motor 120. The control switch has a manual position, indicated by the letter "M" connected directly to the voltage source, an automatic position indicated by the letter "A" connected directly to the carriage switch 191, and a neutral position intermediate the manual and automatic positions and indicated by the letter "N." The carriage switch 191 is also connected directly to the voltage source and has open and closed positions respectively adapted to de-energize and to energize the carriage motor when the control switch is in automatic position. The switch 191 also includes a button 192 in engagement with the inner surface of the actuator disc 60 and conventional spring means, not shown, yieldably urging the switch into a closed position. However, engagement of the disc with the button holds the switch in open position. The button rides along the disc during rotation of the workpiece mounting shaft 50 on a circular line extended through the inner slot 70 in the disc so that when the disc has reached a predetermined angular or rotational position, the button registers with the slot and allows the yieldable means of the switch to urge the button into the slot whereupon the switch is closed. When the button engages the inner cam portion 78, it rides out of the slot, back into engagement with the disc, and again opens the carriage switch. Thus it will be seen that adjustment of the plate 72 longitudinally of the slot 70 lengthens or decreases the time during which the switch is closed and consequently the length of time the carriage motor 120 is energized. The foregoing operation again assumes, of course, that the control switch 190 is in automatic position.

The electrical system also includes a relay 195 having a coil connected in electrical series circuit with the welding electrode 185, with a secondary source of voltage 196, and with the workpiece 57 through the shaft 50, the grounding sleeve 38, the conducting rod 39 and the grounding cable 43. The relay also has contacts in electrical circuit with a three-position "manual," "neutral" and "automatic," workpiece motor control switch 197, the primary source of voltage 189, and the workpiece motor 87. The control switch 197 is constructed like the switch 190. When the switch 197 is in automatic position, the workpiece motor is connected to the voltage source 189 through the relay contacts. The effect of this circuitry, in the automatic position of the control switch, is to energize the workpiece motor incident to and only during electrical contact between the electrode 185 and the workpiece. By moving the switch 197 to manual position, the workpiece motor is connected directly to the source of voltage 189. In the neutral position, neither of these connections are made. It is also to be noted that the neutral position of the carriage control switch 190 is connected to the relay contacts so that in this position the carriage 116 travels along the track 110 incident to and only during contact between the electrode and the workpiece.

*Operation*

The operation of the described embodiment of the subject invention is believed to be readily apparent and is briefly summarized at this point. As explained above, the subject invention is conveniently described in connection with the rebuilding of idlers or rollers of the type employed in tracklaying vehicles but it is not to be limited to this specific use.

Thus, the idler, or other workpiece, 57 is secured to the workpiece shaft 50. The welding electrode 185 is connected in the clamp 183. The carriage 116 is moved by means of the hand wheel 118 along the track 110 until the electrode is in a plane disposed transversely of the shaft 50 and inwardly adjacent to one of the flanges 200 of the idler. It is of course to be understood that it is desired to build up the bearing surface 201 between the flanges with weld material.

The fulcrum member 155 is longitudinally adjusted in the slot 150 depending on the diameter of the idler 57 so that with the lever 165 in its upwardly pivoted position, the electrode 185 is held in upwardly spaced relation to the bearing surface 201 to be rebuilt. Of course, the rod 180 is secured against rotation relative to the post 149.

In welding operations of this type, it is usually desirable to provide a circumferential bead or band of weld material on the bearing surface 201, thereafter to step the welding electrode 185 over a predetermined increment, then to apply a second bead adjacent to the first, to step the electrode over again, to apply a third bead, and so on. However, because of the fluid state of the weld material, these beads flow together to produce a continuous layer of weld material. Thus, the actuator disc 60 is rotated on the shaft 50 so that the button 192 is at the trailing end of the slot 70 with respect to the direction of rotation of the disc relative to the switch 191. That is, the button is on the plate 72 adjacent to the cam portions 78. Also, the plate 72 is adjusted by means of the setscrew 74 to provide the desired length of the slot 70 coresponding with the desired step-over of the electrode after each revolution of the shaft 50. The outer slot 71 and outer cam portion serve to guide the plate during arcuate adjustment and to hold the inner cam portion in the inner slot. Other adjustments which may be made are in the speed and direction of the shaft 50 and the carriage 116. Also the control switches 190 and 197 are placed in their automatic positions.

With all of the preliminary adjustments made, the apparatus is in readiness for operation. Thus, the lever 165 is lowered to bring the electrode 185 into contact with the idler bearing surface 201. This closes the relay 195 and energizes the workpiece motor 87 to rotate the workpiece mounting shaft 50 and thus the workpiece. It also strikes the arc of the electrode and thus, with the idler rotating, a bead of weld material is deposited on the bearing surface 201. After a complete revolution of the shaft, the button 192 falls into the slot 70 to energize the carriage motor 120 and to motivate the carriage 116 longitudinally of the track 110. Thus, the electrode is stepped-over and continues to apply a second bead of weld material on the bearing surface 201. The carriage is stopped when the button rides back onto the inner surface of the actuating disc 60 via the inner cam portion 78 to open the carriage switch and de-energize the carriage motor. It will be evident that the apparatus automatically moves the electrode over in successive steps incident to successive complete revolutions of the shaft so that a continuous annular layer of weld material is deposited on the bearing surface 201 building it up to its desired thickness. When the last annular bead has been laid, the lever 165 is raised to break the circuit to the workpiece rotating motor 87 thereby to stop the actuating disc 60 and to hold the carriage switch 191 open so that the carriage 116 does not move over a further step. Also, raising the lever 165 breaks the arc and stops the welding action.

It will be evident from the foregoing that an apparatus has been provided for automatically applying a substantially uniform, continuous layer of weld material on the bearing surface of an annular member thereby to rebuild the bearing surface. The use of the apparatus for this purpose eliminates subsequent grinding and finishing operations, and results in a saving of time and expense. Significant features of the invention are the automatic step-over of the worktool after predetermined rotation of the workpiece, the elevational adjustment of the worktool relative to the workpiece, the automatic rotation and stoppage of the workpiece incident to striking and breaking the arc, and the improved ground connection for the shaft and the workpiece thereon. Although the apparatus has been described in connection with this type of a welding operation, it is also useful for welding sheet material and for this purpose the rack 130 is removed from the carriage 116, as illustrated, and reinserted on the other side so that the sleeve 145 and post 149 are on the opposite side from that shown. In this manner the welding electrode 185 can be used for performing welding operations on sheet material, not shown, but by positioning such sheet material on a support surface adjacent to the rearward edge of the bench 10 and on the opposite side of the trough 106 from the cradle 11.

For welding a seam between two adjacent edges of a pair of plates of sheet metal, for example, it is usually desirable to start the carriage 116 traveling along the track 110 immediately upon striking the arc between the workpieces and the electrode 185. In such applications, of course, the workpiece motor 87 and workpiece motor control switch 197 are not employed. Further, because the carriage motor 120 is not to be energized and de-energized incident to predetermined rotation of the shaft 50, the carriage triggering switch 191 is also not utilized. With reference to the electrical circuit in FIG. 5 it is to be understood that for welding sheet material, the electrical circuit would be changed somewhat so as to omit the wiring connections which are there illustrated to the workpiece motor 87, the workpiece motor control switch 197, and the carriage triggering switch 191. However, for simplicity of drawing, an additional circuit omitting these elements and their associated wiring is not provided since the circuit shown is effective for this purpose by leaving certain switches open, as explained below. In this situation, of course, the sheet materials being welded take the place of workpiece 57 in the electrical circuit of FIG. 5 and are connected back to the secondary source of voltage 196 by means of a grounding wire 43.

Before bringing the electrode 185 into contact with the sheet materials to be seam-welded, the carriage motor control switch 190 is placed in its neutral position so as to connect the carriage motor 120 to the source of voltage 189 through the relay contacts of the relay 195. Further, for the purpose of considering this operation with the circuit as illustrated in FIG. 5, the switch 197 is assumed to be in neutral position so that the workpiece motor is not connected in the circuit, and the triggering switch is assumed to be open. The carriage is then moved along the track 110 manually by means of the handle 181 until the electrode 185 is above the predetermined starting position along the seam to be welded. By means of the lever 165, the electrode is then lowered into engagement with the work material whereupon the arc is struck. Also, this energizes the relay 195 to close its relay contacts and to complete the electrical circuit to the carriage motor 120 through the control switch 190, the relay contacts, and back to the primary source of voltage 189. Thus, the carriage 116 moves along the track carrying the electrode therewith immediately upon striking the arc. This moves the electrode at a smooth, substantially continuous rate of speed to apply the weld material to the seam to be welded. Upon raising the lever, the arc is broken. This de-energizes the relay 195 and stops the carriage motor and thus the carriage 116.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In an apparatus for surfacing a workpiece by a worktool; a support; a shaft rotatably journaled in the support and adapted to mount a workpiece for rotation with the shaft; primary drive means connected to the shaft for rotating the shaft; a carriage borne by the support adapted to mount the worktool in a work position adjacent to the workpiece on the shaft and for travel along a path in laterally spaced substantially parallel relation to the shaft; electrical drive means connected to the carriage for motivating the carriage along said path; electro-mechanical means operably interconnecting the shaft and the electrical drive means for motivating the carriage along said path a predetermined step each time the shaft rotates through a predetermined angle, the electro-mechanical means including an electrical switch having open and closed positions and connected in electrical circuit with the electrical drive means; means yieldably urging the switch into closed position; and an actuator mounted on the shaft engaging the switch and intermittently operably opening and closing the switch incident to predetermined rotation of the shaft thereby to move the carriage along said path by such predetermined step during each closing of the switch.

2. In an apparatus for surfacing a workpiece with a worktool; a support; an elongated shaft mounted for rotation in the support and adapted to receive a workpiece to be surfaced for rotation with the shaft; primary drive means mounted on the support and connected to the shaft for imparting rotation thereto; an elongated track mounted in the support and extended in laterally spaced substantially parallel relation to the shaft; a carriage adapted to mount a worktool in work position adjacent to the workpiece and supported by the track for longitudinal movement therealong; electrical drive means borne by the support and connected to the carriage for motivating the carriage along the track during energization of the electrical drive means; an electrical system including an electrical switch mounted on the support and connected in electrical circuit with the electrical drive means, the switch having open and closed positions respectively adapted to energize and to de-energize the electrical drive means; and actuating means mounted on the shaft and engaging the switch incident to rotation of the shaft intermittently operably opening and closing the switch thereby to move the carriage along the track in successive predetermined increments incident to rotation of the shaft through successive predetermined angles.

3. The apparatus of claim 2 wherein said actuating means includes a disc mounted on the shaft for rotation with the shaft adjacent to the switch and providing a slot concentric to the shaft, wherein the switch includes means yieldably urging the switch into closed position and a button engaging the disc for holding the switch in open position against the urgence of said yieldable means but moving into and out of the slot during each revolution of the shaft to permit said yieldable means to urge the switch into closed position.

4. The apparatus of claim 3 including a plate mounted on the disc and longitudinally adjustably overlaying the slot for increasing and decreasing the length of the slot thereby to increase and decrease the length of time said button is in the slot during each revolution of the shaft and thereby to adjust the increment of movement of the carriage along said path.

5. The apparatus of claim 3 wherein a stop member is secured to the end of the shaft adjacent to the disc, wherein the disc is rotatably mounted on the shaft, and wherein a coil spring encircles the shaft and has opposite ends respectively bearing against the disc and the support for urging the disc into engagement with the stop to enable its rotation with the shaft.

6. In an apparatus for depositing a plurality of annular beads of weld material in side-by-side relation on an annular surface of a workpiece so as to form a continuous smooth annular layer of such material on the workpiece, a support, an elongated workpiece shaft rotatably mounted on the support and adapted to have the workpiece rigidly connected thereto with said annular surface concentric to the shaft, an electrical workpiece motor mounted on the support having driven connection to the work shaft for imparting rotation thereto incident to energization of the motor, an elongated track mounted on the support in laterally spaced substantially parallel relation to the workpiece shaft, a carriage, means mounting the carriage on the track for longitudinal movement therealong, a carriage motor borne by the carriage and having driving connection to the carriage mounting means for moving the carriage along the track, a welding electrode supported on the carriage in a position adjacent to the workpiece shaft and adapted for contact with a workpiece on the shaft, an electrical system including a switch connected in electrical circuit with the carriage motor and mounted on the support, the switch having on and off positions respectively adapted to energize and de-energize the carriage motor, means yieldably urging the switch into closed position, and an actuator connected to the workpiece shaft for rotation therewith and engaging the switch for alternately holding the switch open and releasing the switch for closing by the yieldable means during successive predetermined angles of rotation of the shaft intermittently to energize the carriage motor each time the switch is closed so as to move the carriage and the electrode longitudinally of the shaft in successive predetermined steps during rotation of the shaft.

7. The apparatus of claim 6 wherein the workpiece motor is connected in electrical circuit with a source of electrical voltage, the workpiece and the electrode whereby the workpiece motor is energized incident to electrical contact being established between the electrode and the workpiece.

8. The apparatus of claim 7 including an electrically conductive grounding sleeve rigidly mounted on the support and rotatably receiving the shaft in frictional slidable contact therewithin; and wherein said electrical circuit includes an electrical conductor interconnecting the grounding sleeve and the source of voltage.

9. The apparatus of claim 6 wherein means are provided for mounting the electrode on the carriage for adjustable movement radially inwardly and outwardly with respect to the shaft and for holding the electrode in selected positions with respect to the shaft.

10. In a worktool mounting apparatus; an elongated sleeve; an elongated post adapted to mount a worktool thereon coaxially fitted in the sleeve in slidable frictional engagement with the sleeve for movement inwardly and outwardly of the sleeve; a rigid fulcrum member connected to the post and transversely outwardly extended therefrom; and an elongated lever pivotally connected to the sleeve for pivotal movement around an axis in spaced substantially parallel relation to the fulcrum member and having a slot through which the fulcrum member is extended whereby the post is moved inwardly and outwardly of the sleeve incident to pivotal movement of the lever.

11. The apparatus of claim 10 wherein the fulcrum member is mounted on the post for longitudinal adjustable movement into selected positions therealong.

12. In a worktool mounting apparatus, a support; a sleeve rigidly mounted in the support; a tubular post adapted to mount a worktool thereon frictionally axially slidably received in the sleeve and having an elongated longitudinally extended slot therein; an elongated lever pivotally connected to the sleeve for pivotal movement around an axis disposed in a plane in spaced parallel relation to the plane of the slot in the post and pivotally movable into opposed relation to the slot, the lever having an arcuate slot eccentric to said pivotal axis and disposed transversely of the post when the lever is in said opposed relation; a screw extended through both of the slots, slidable longitudinally thereof, having an inner end within the post, and having an outer end extended outwardly from the lever; means connected to the inner end of the screw, engaging the post, and precluding rotation of the screw relative to the post; and an elongated thimble screw-threaded on the outer end of the screw and extended through the slot in the lever for threading on the screw and tightening against the post thereby adjustably to hold the thimble in selected positions longitudinally of the slot in the post whereby the post is slid inwardly and outwardly of the sleeve incident to pivotal movement of the lever with the screw held in such selected positions.

References Cited in the file of this patent

UNITED STATES PATENTS

| | | |
|---|---|---|
| 1,827,245 | Lincoln et al. | Oct. 13, 1931 |
| 2,299,747 | Harter | Oct. 27, 1942 |
| 2,427,350 | Carpenter et al. | Sept. 16, 1947 |
| 2,868,165 | Altman | Jan. 13, 1959 |
| 2,914,651 | Ackerman | Nov. 24, 1959 |